United States Patent
Bravo-Abad et al.

(10) Patent No.: US 8,285,091 B2
(45) Date of Patent: Oct. 9, 2012

(54) EFFICIENT TERAHERTZ SOURCES BASED ON DIFFERENCE-FREQUENCY GENERATION IN TRIPLY-RESONANT PHOTONIC RESONATORS

(75) Inventors: Jorge Bravo-Abad, Cambridge, MA (US); Ian B. Burgess, Medford, MA (US); John D. Joannopoulos, Belmont, MA (US); Steven G. Johnson, Cambridge, MA (US); Marko Loncar, Cambridge, MA (US); Murray W. McCutcheon, Jamaica Plain, MA (US); Alejandro W. Rodriguez, Miami, FL (US); Marin Soljacic, Belmont, MA (US); Yinan Zhang, Cambridge, MA (US)

(73) Assignees: Massachusetts Institute of Technology, Cambridge, MA (US); President & Fellows of Harvard College, Cambridge, MA (US)

(*) Notice: Subject to any disclaimer, the term of this patent is extended or adjusted under 35 U.S.C. 154(b) by 235 days.

(21) Appl. No.: 12/834,524

(22) Filed: Jul. 12, 2010

(65) Prior Publication Data
US 2012/0194901 A1    Aug. 2, 2012

Related U.S. Application Data

(60) Provisional application No. 61/224,566, filed on Jul. 10, 2009.

(51) Int. Cl.
G02B 6/26    (2006.01)
(52) U.S. Cl. .............. 385/27; 385/14; 385/15; 385/39; 385/122; 385/129

(58) Field of Classification Search .............. 385/14, 385/15, 27, 39, 122, 129
See application file for complete search history.

(56) References Cited

U.S. PATENT DOCUMENTS

| 7,689,086 B2 * | 3/2010 | Magnusson et al. ......... 385/129 |
| 7,693,203 B2 * | 4/2010 | Birkedal et al. ......... 372/50.124 |
| 7,715,665 B2 * | 5/2010 | Ushida et al. ................. 385/14 |

FOREIGN PATENT DOCUMENTS

| JP | 2000-235203 | 8/2000 |
| JP | 4122386 | 7/2008 |

OTHER PUBLICATIONS

Y. Q. xu et al., "Widely tunable triply-resonant optical parametric ring oscillator" IEEE/LEOS Winter Topicals Meeting Series 2009 Jan. 12, 2009, pp. 264-265.
J. Zondy et al., "Dynamical signatures of self phase-locking in a triply resonant parametric oscillator" CLEO 2004, May 16, 2004, vol. 1, pp. 2-3.
M. Takahashi et al., "A Stable Widely Tunable Laser Using a Silica-Waveguide Triple-Ring Resonator" OFC 2005, Mar. 6, 2005, vol. 5, pp. PDP 19.
International Search Report and Written Opinion issued in connection with corresponding PCT Application No. PCT/US10/41713, mailed on May 31, 2011.

* cited by examiner

*Primary Examiner* — Jennifer Doan
(74) *Attorney, Agent, or Firm* — Gesmer Updegrove LLP

(57) ABSTRACT

A system for efficient generation of THz radiation is provided that includes a triply-resonant nonlinear photonic resonator coupled to at least one near-infrared (NIR) or optical waveguide and to at least one THz waveguide. The energy traveling through the at least one near-infrared (NIR) or optical waveguide is converted to THz radiation inside the triply-resonant photonic resonator via a nonlinear difference frequency generation (DFG) process.

22 Claims, 14 Drawing Sheets

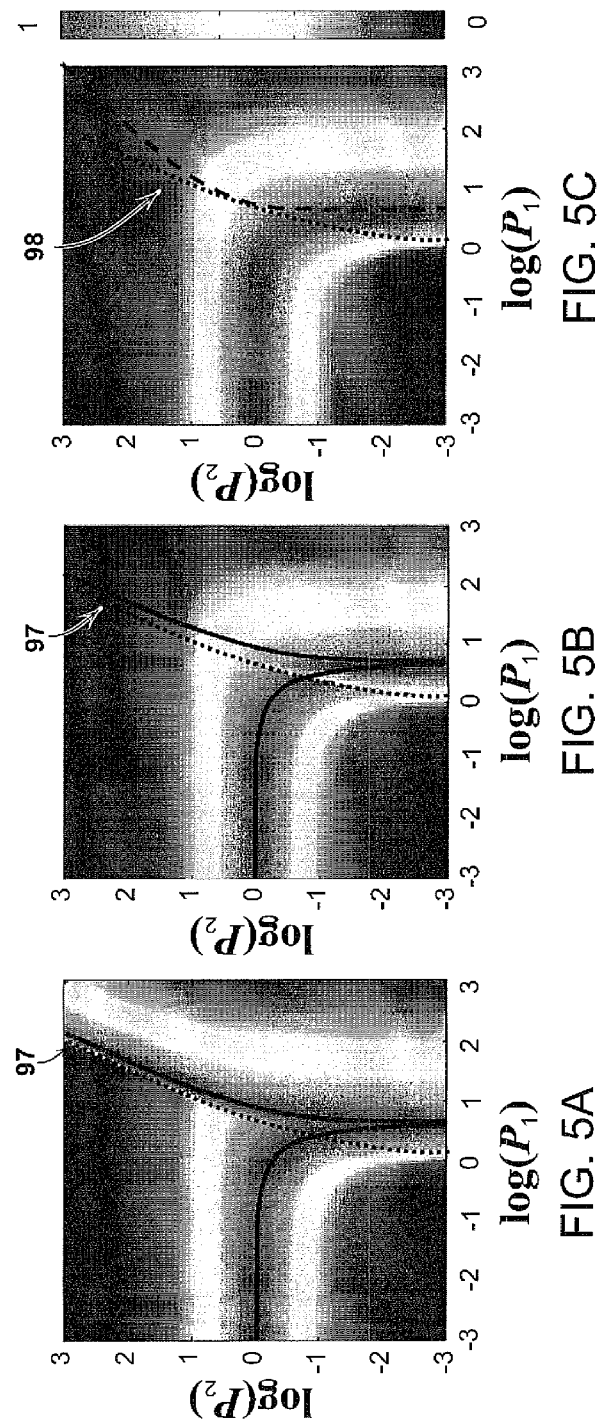

EFFICIENT TERAHERTZ SOURCES BASED ON DIFFERENCE-FREQUENCY GENERATION IN TRIPLY-RESONANT PHOTONIC RESONATORS

PRIORITY INFORMATION

This application claims priority from provisional application Ser. No. 61/224,566 filed Jul. 10, 2010, which is incorporated herein by reference in its entirety.

GOVERNMENT SPONSORSHIP

This invention was made with government support under grant numbers DMR0819762 and PHY0646094 awarded by the National Science Foundation, and grant number W911NF-07-D-0004 awarded by the Army Research Office. The government has certain rights in this invention.

BACKGROUND OF THE INVENTION

The invention is related to terahertz sources, and in particular to efficient terahertz sources based on difference-frequency generation in triply-resonant photonic resonators.

Nonlinear optical frequency conversion is widely used for the generation of light in parts of the spectrum for which there are no convenient sources. In particular, nonlinear processes are regarded as a promising route to generation of coherent radiation in the THz frequency range. Recently there has been a renewed interest in using cavity-enhanced nonlinear frequency conversion to enable greater flexibility and THz powers, as improved designs and fabrication techniques have paved the way for the realization of wavelength-scale cavities, thus allowing efficient conversion at increasingly low powers.

SUMMARY OF THE INVENTION

According to one aspect of the invention, there is provided a system for efficient generation of THz radiation. The system includes a triply-resonant nonlinear photonic resonator coupled to at least one near-infrared (NIR) or optical waveguide and to at least one THz waveguide. The energy traveling through the at least one near-infrared (NIR) or optical waveguide is converted to THz radiation inside the triply-resonant photonic resonator via a nonlinear difference frequency generation (DFG) process.

According to another aspect of the invention, there is provided a method for generating efficient THz radiation. The method includes providing a triply-resonant nonlinear photonic resonator coupled to at least one near-infrared (NIR) or optical waveguide and to at least one THz waveguide. Also, the method includes converting the THz radiation inside the triply-resonant photonic resonator via a nonlinear difference frequency generation (DFG) process.

BRIEF DESCRIPTION OF THE DRAWINGS

FIGS. 5A-5C are graphs illustrating maximum and minimum normalized efficiency parameter ($E_{ff}$) for stable a CW DFG;

DETAILED DESCRIPTION OF THE INVENTION

The invention involves a system for efficient generation of THz via difference frequency generation (DFG) caused by a second order ($X^{(2)}$) nonlinear polarization in a triply-resonant photonic structure. In contrast with most of previous works in this context, the case where both the input pump (highest frequency) and idler waves are resonant, as well as the generated signal wave at the difference frequency. The invention shows that continuous-wave (CW) conversion from pump to signal with quantum-limited efficiency (complete depletion of the pump) is possible in such a system for any power at the pump frequency, provided there is a critical input power at the idler frequency. The steady-state solutions to the coupled wave equations and their corresponding conversion efficiencies are shown to only depend on universal dimensionless parameters, indicating that their structure is qualitatively the same in all geometries. While the stability of these solutions is the only feature that is geometry dependent, one can demonstrate that in a certain region of the pump-idler power-space, there is only one steady-state solution to the coupled wave equations that is stable in all geometries. Within this range, quantum-limited conversion corresponds to the only stable solution for all triply resonant geometries, at a critical idler power. Outside of this region, it is shown that bistability exists. The effect of linear losses (e.g. scattering and absorption) results in a rescaling of the conversion efficiency and input powers, with the dynamics remaining qualitatively the same. The maximum efficiency is attained in the over-coupled limit, when the Q-factor is limited by coupling to the input/output port.

Figure 1A:
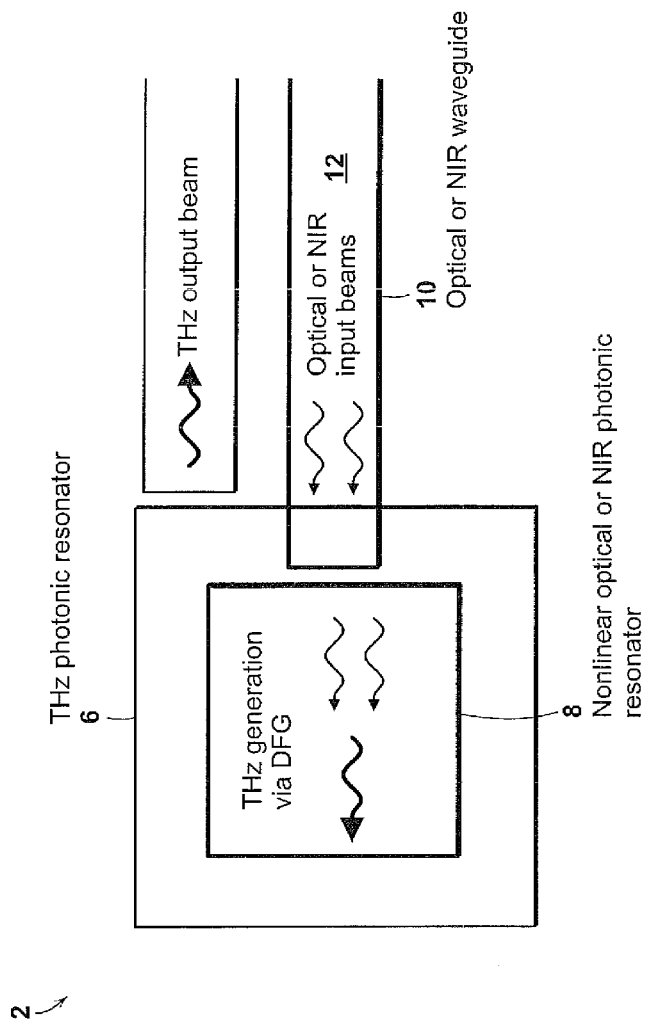
FIGS. 1A-1B are schematic diagrams of two alternative configurations of the invention.
Figure 1B:
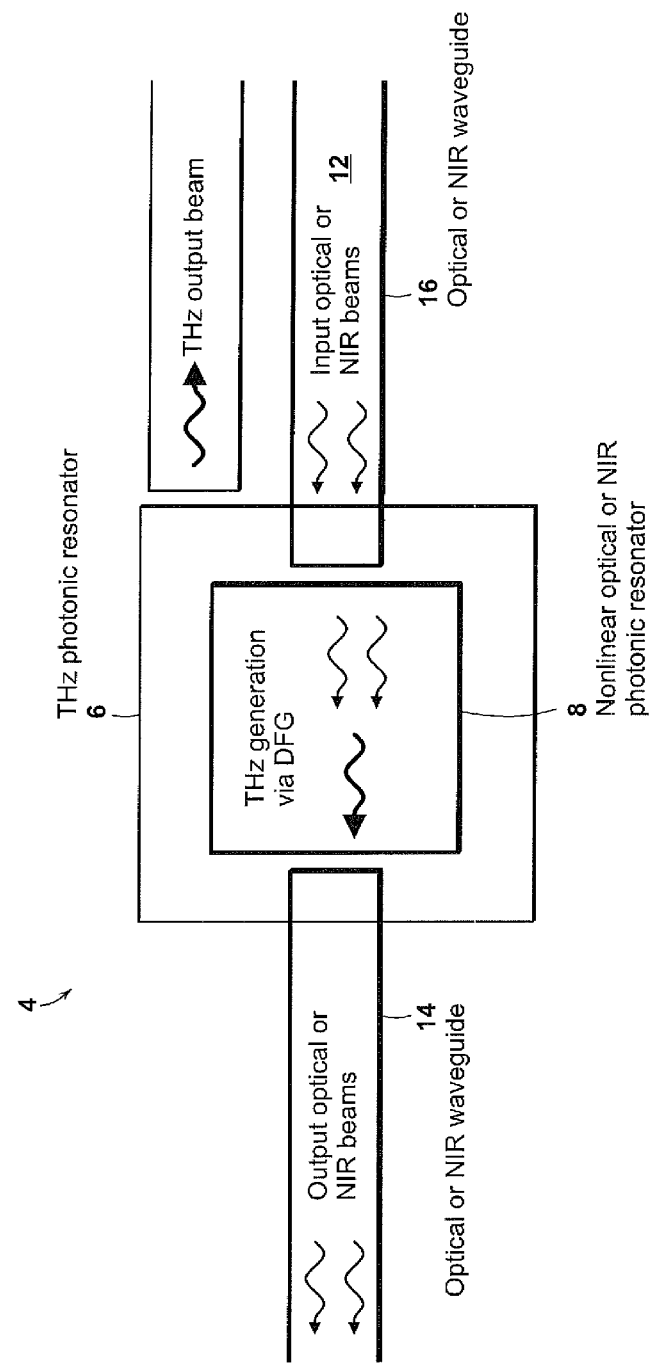

FIGS. 1A-1B show a schematic layout of two alternative configurations 2, 4 of the invention. In the configuration 2 displayed in FIG. 1A, the power carried by two optical or near-infrared beams 12 is transferred to a first photonic microresonator 6 by means of an optical or near-infrared waveguide 10 coupled evanescently to the microresonator 6. This first photonic microresonator 6 includes a material with second-order ($X^{(2)}$) optical nonlinearity. Inside the microresonator 6, the optical or near-infrared energy is converted into THz energy by means by way of a nonlinear second-order ($X^{(2)}$) nonlinear difference-frequency generation.

The efficiency of this process is enhanced dramatically when the whole system is designed so that the frequencies of the two optical or near-infrared beams 12 coincides with two resonant frequencies of the first photonic resonator 6 and, at the same time, the frequency of the emitted THz radiation coincides with the frequency of a nonlinear photonic resonator 8. Finally, the THz radiation is coupled to a THz waveguide that permits extracting efficiently the THz energy generated inside the first microresonator 6. The description of the configuration 4 shown in FIG. 1B is the same as FIG. 1A, but now there are two optical or near-infrared waveguides 14, 16 coupled to the microresonator 6; one of them acting as the input port 16 (right waveguide in the figure), while the other acting as a output port 14 for the optical or near-infrared beams 12.

The triply-resonant photonic resonator can include a nonlinear photonic resonator 8 for NIR or optical frequencies embedded in or placed in the proximity of the photonic resonator for THz frequencies, in such a way that if the NIR cavity is removed a THz cavity mode would be significantly modified. The nonlinear photonic resonator 8 for NIR or optical frequencies can include a doubly-resonant photonic resonator. The doubly-resonant photonic resonator comprises two resonant wavelengths $\lambda_1$ and $\lambda_2$ in air that support two resonant modes characterized by quality factors $Q_1$ and $Q_2$, respectively, and by modal volumes $V_1$ and $V_2$, respectively; with 400 nm<$\lambda_1$<20 μm and 400 nm<$\lambda_2$<20 μm. Also, the doubly-resonant photonic resonator can include a photonic crystal cavity or a longitudinally perturbed ridge waveguide or an undercut ridge waveguide. The photonic resonator for THz frequencies can include a resonant wavelength in air $\lambda_T$, a quality factor Q, and a modal volume $V_T$; with 30 μm<$\lambda_T$<3000 μm. The photonic resonator can have a longitudinally perturbed ridge waveguide or undercut ridge waveguide or photonic crystal cavity. The THz waveguide can have a dielectric waveguide or a photonic crystal waveguide.

Figure 2A:
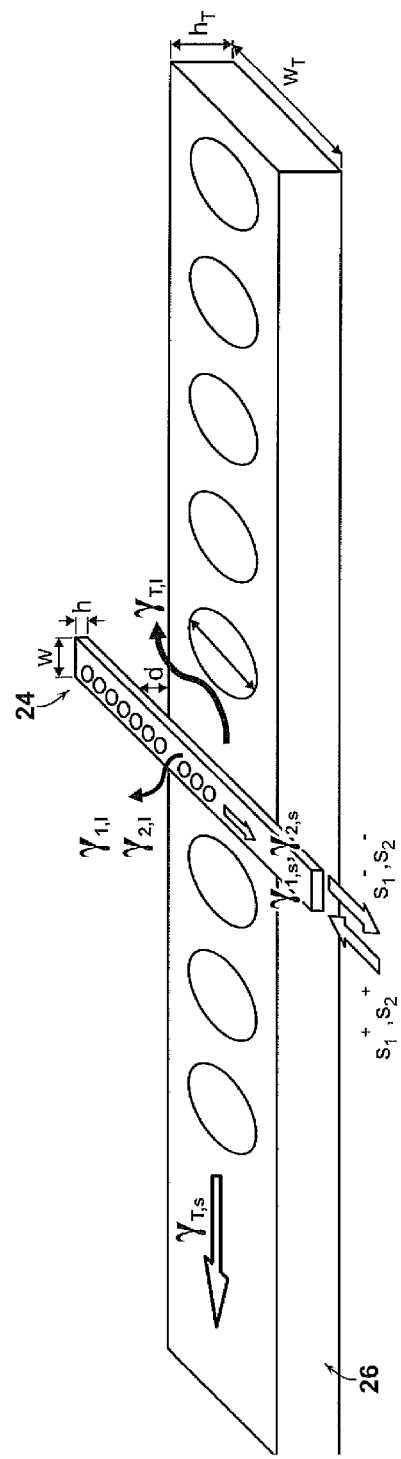
FIGS. 2A-2C are schematic diagrams illustrating the first physical implementation for efficient THz generation.

There are also various physical implementations of the invention. Several different physical implementations of the invention are discussed, as shown in FIGS. 2A-2F. These implementations include two nested cavities. The first cavity 24, designed to operate at telecom wavelengths and realized in nonlinear material (e.g. III-V), produces nonlinear-polarization at THz, as shown in FIG. 2A. The cavity 24 is placed in the proximity of a second 26, much larger, single-mode cavity with the resonance in THz. This implementation takes advantage of the vast difference in the lengthscales of the telecom/optical and THz cavities to allow the designs to be completely decoupled.

The system can be viewed as a classical version of a two-level atom strongly coupled to the optical cavity, with the dual mode telecom/visible cavity making a negligible perturbation on the THz mode. A proof-of-concept example of this type of design is explored here in detail and shown in FIG. 2A. Here, both the telecom and THz cavities are photonic crystal "nano-beam" cavities 22, 24. The telecom cavity has both TE-like and TM-like high-Q fundamental modes. One can suspend the telecom band cavity slightly above the THz cavity near the field maximum, sufficiently far that the telecom modes are not affected by the presence of the THz cavity, but sufficiently close that the long-wavelength THz mode extends sufficiently into this cavity. In this way one can achieve a high overlap between the three confined modes by mixing three mutually orthogonal polarizations through the strong $X^{(2)}_{ijk}(i \neq j \neq k)$ terms in III/V semiconductors (e.g. GaAs, GaP). The invention takes advantage of recently demonstrated doubly-resonant ultra-high Q photonic crystal nanobeam resonators 22, 24 with mutually orthogonally polarized modes (i.e. one is TE-like one is TM-like). Both cavities are preferentially coupled to a corresponding waveguide extending from one end, with the length of the Bragg mirror of holes at one end used to tune the strength of the coupling. The Bragg mirror at the other end is made sufficiently long that leakage in that direction is much smaller than out of plane losses. An alternative design would be based on a telecom PhCNC embedded at the center of the THz cavity composed of different material (e.g. polymers, ceramics).

Figure 2B:
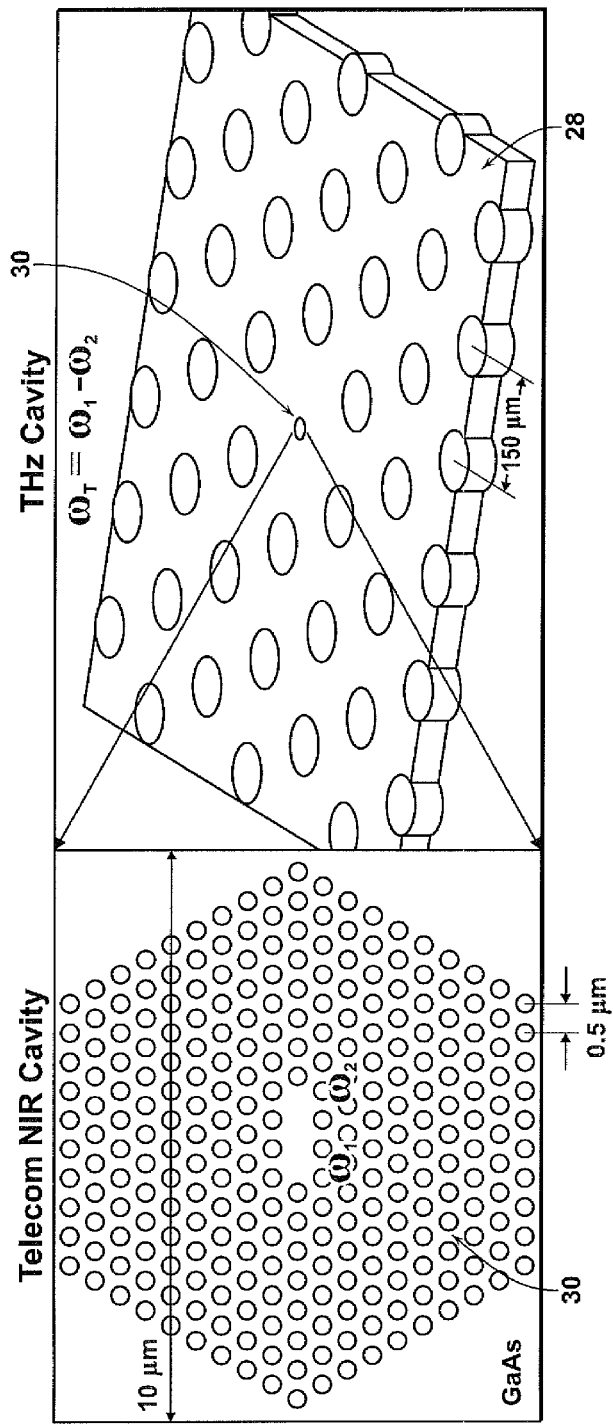
Figure 2C:
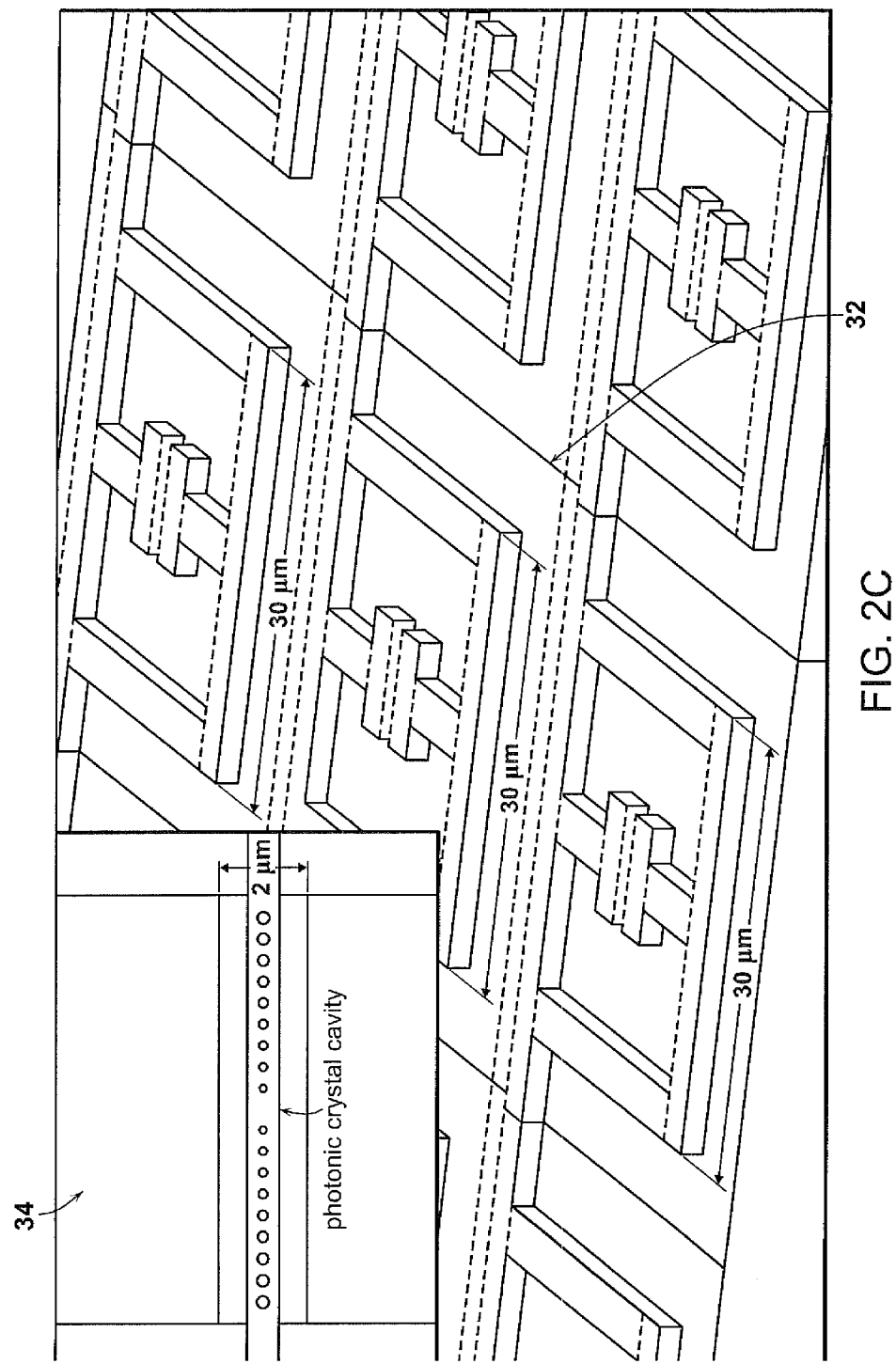

FIG. 2B shows nested 2-D photonic crystal cavities 28, 30. Telecom cavity supports 30 two high-Q closely spaced modes and is embedded inside of (or suspended just above) a much larger 2D photonic crystal cavity 28 supporting THz modes. The THz cavity 28 can also be a 1-D nanobeam cavity in this geometry. FIG. 2C shows another variant of this concept having a dual-mode nanobeam cavity 34 placed inside the gap of a metamaterial split ring resonator cavity 32.

Figure 3A:
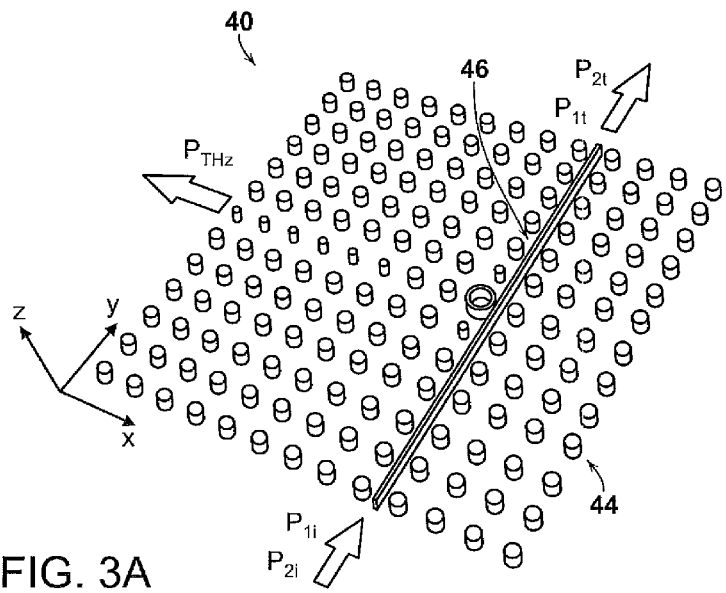
FIG. 3A-3F are schematic diagrams illustrating the second physical implementation for efficient THz generation.
Figure 3B:
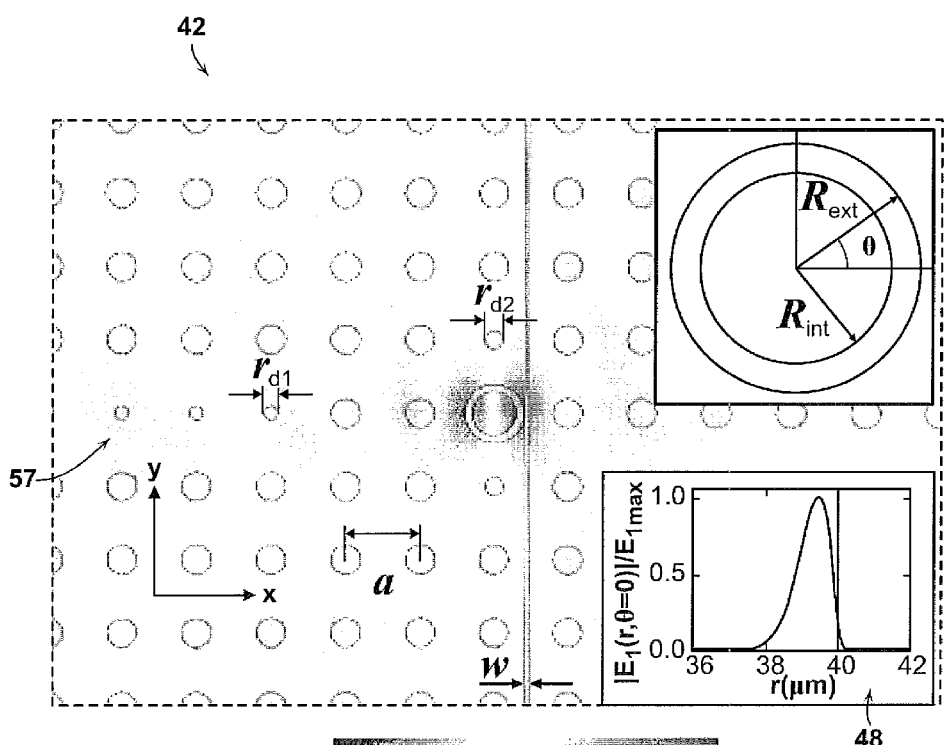

The second physical implementation are disclosed FIGS. 3A-3F. In this type of design, the telecom cavity is designed as a component of the THz cavity, its presence having a considerable effect on the THz modes. The specific geometry 40 in FIG. 3A is examined in detail. The power carried by two near-infrared beams of wavelengths $\lambda_1$=1542 nm and $\lambda_1$=1550 nm (their corresponding power is denoted in FIG. 3A by $P_{1i}$, and $P_{2i}$, respectively) is coupled to a nonlinear ring 44 resonator by means of an index-guided waveguide 46. The width of the waveguide 46 is w=450 nm, while the external and internal radius of the ring 44 are $R_{ext}$=40.1 μm and $R_{int}$=30.1 μm, respectively.

These values for and $R_{ext}$ and $R_{int}$ were optimized so the ring resonator 44 can support two high-order whispering gallery modes (WGM) at $\omega_1$ and $\omega_2$, such that $\omega_T = \omega_1 - \omega_2$. Specifically, the proposed system is created from GaAs, at $\lambda_1$=1542 nm the ring resonator supports a TE-polarized WGM characterized by an angular moment $m_1$=575, whereas for $\lambda_2$=1550 nm there exits a TM-polarized WGM with $m_2$=572. The inset 48 of FIG. 3B displays a contour plot of the product $E_{1x}(x, y)E^*_{2y}(x, y)$, where it is apparent the azimuthal dependence $\exp[i(m_2-m_1)\theta]$. As can be also deduced from the inset 48 of FIG. 3B, the high-order value of angular moment of the two considered WGM yields in both cases an electric field profile that is confined in a small region close to edge of the ring resonator. This is illustrated in bottom index of FIG. 3B, which renders the radial dependence of $|\vec{E}_i(x, y)|$, where the vertical red line corresponds to $R_{ext}$.

The described ring resonator is in turn embedded as a dipole-like defect in an otherwise perfectly periodic THz-wavelength scale photonic crystal formed by a square lattice of GaAs rods of radius r=20.4 μm, the lattice constant being α=102 μm. The above described structure has been optimized for efficient emission at $\omega_T/2\pi$=1 THz. In order to extract efficiently the THz power generated inside the ring resonator, a coupled-cavity waveguide (CCW) is added to the THz-scale PhC. In particular, this CCW THz waveguide has been created by reducing to the radius of a row rods to $r_{d1}$=10.2 μm. Furthermore, to avoid the coupling of the emitted THz radiation to the degenerate dipole-mode orthogonal to the one displayed in FIG. 3B (which can not be coupled to the THz CCW modes) the radius of the two of the nearest neighbors rods of the disk resonator to $r_{d2}$=13.2 μm. FIGS. 3C-3F display alternative implementations of this scheme.

Figure 3C:
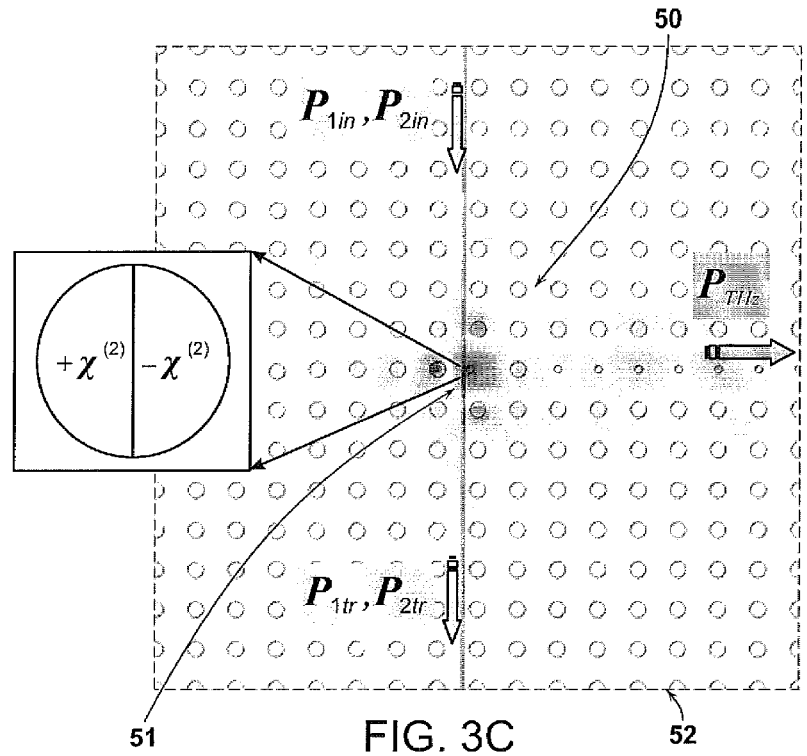
Figure 3D:
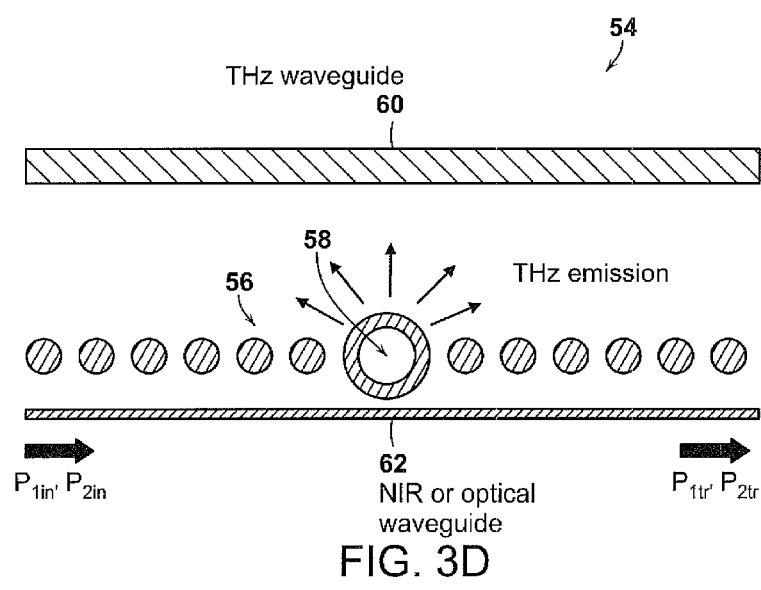

In particular, FIG. 3C shows a monopole defect mode 50 in a THz-scale nonlinear photonic crystal 52 is phase-matched to two whispering gallery modes (WGM) circulating inside the defect rod by introducing a periodic poling in the defect rod. FIG. 3D shows another implementation 54 having a one-dimensional (1D) periodic array of nonlinear rods 56, in which the central rod has been replaced by a ring resonator 58 supporting two WGMs at the idler and pump frequencies. The nonlinear interaction that takes place between both WGMs produces a current distribution that radiates THz energy. The emitted THz energy is collected by a THz waveguide 60 placed in the proximity of the PhC configuration 56 and underneath the PhC configuration 56 is a NIR or optical waveguide 62.

Figure 3E:
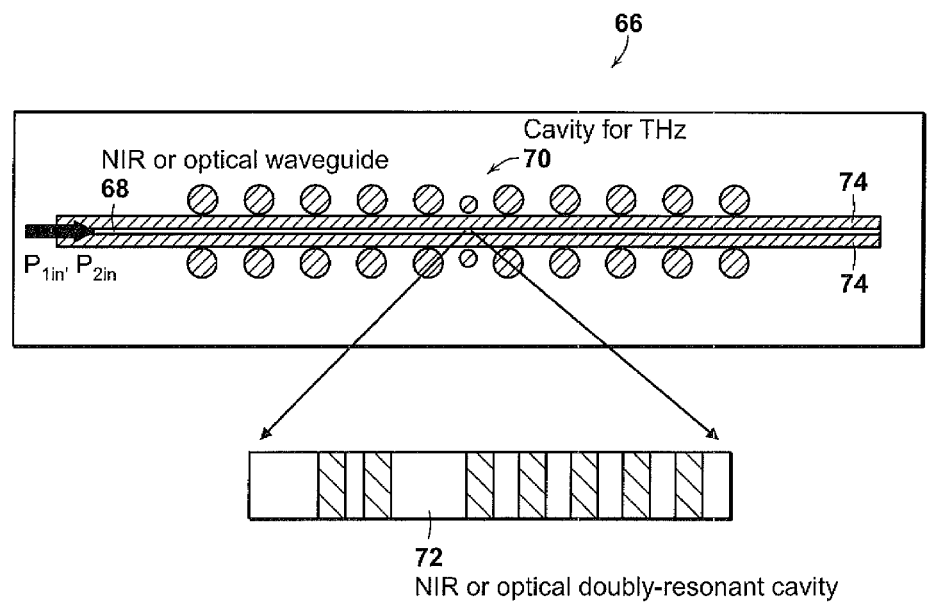

FIG. 3E show a schematics diagram of another implementation 66 based on a triply-resonant photonic crystal configuration. The power carried by two optical or NIR beams traveling through an optical or NIR waveguide 68 (which, in turn, is embedded in a THz waveguide 74) gets trapped inside a 1D doubly-resonant asymmetric PhC cavity 72. This cavity 72 is embedded in a THz-scale cavity 70 created by reducing the radius of the central rod of two 1D arrays of dielectric rods placed at each side of the THz waveguide 74.

Figure 3F:
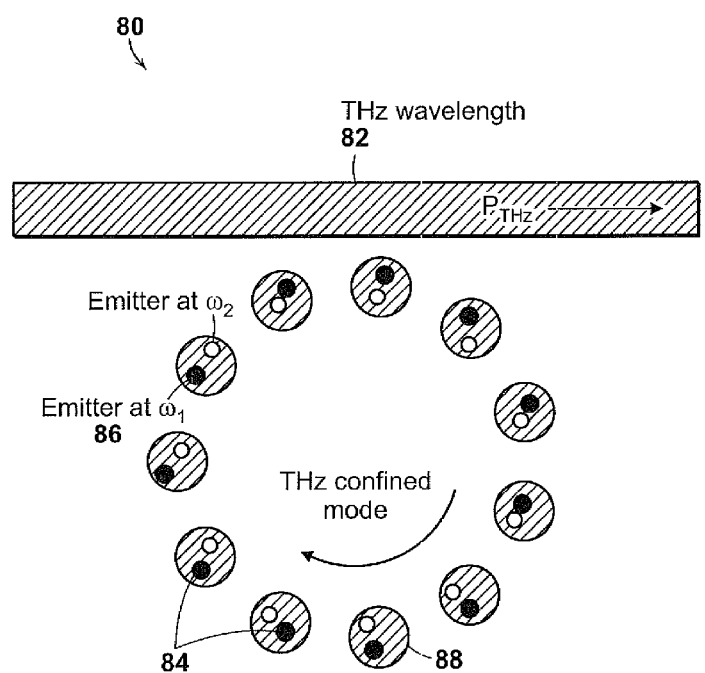

FIG. 3F shows another implementation 80 for efficient THz generation. A circular array of nonlinear dielectric cylinders 84 is placed close to a THz waveguide 84. The THz radiation is generated inside each cylinder 88 by nonlinear frequency mixing of the radiation emitted by two optical or NIR emitters 86 embedded in each one of the cylinders. The evanescent coupling between the THz-scale cylinders 88 gives rise to a waveguide confined mode that circulates inside the cylinder array 84 and decays into the THz waveguide 82.

Figure 4:
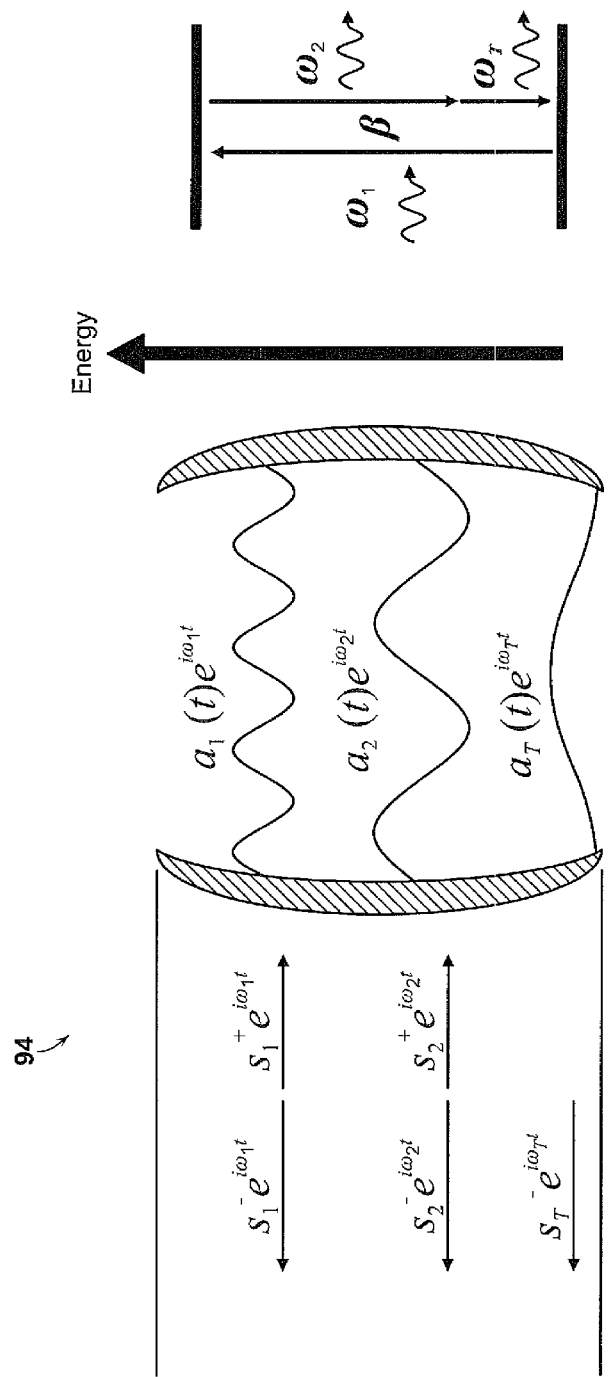
FIG. 4 is a schematic diagram illustrating the CMT framework of an all-resonant DFG used in accordance with the invention.

The general framework 94 of the temporal CMT model is shown in FIG. 4. The cavity has three resonant modes at frequencies, $\omega_1$ (pump), $\omega_2$ (idler), $\omega_T$ (signal) which satisfy $\omega_T = \omega_1 - \omega_2$. The electric field in each cavity mode, $E_k(r,t)$, is decomposed into $E_k(r,t) = E_{k,0}(r)\alpha_k(t)\exp(i\omega_k t)$, where $E_{k,0}$ are the normalized mode profiles ($\int d^3r \epsilon |E_{k,0}|^2 = 1$) and $\alpha_k(t)$ are the slowly varying wave amplitudes, normalized so that $|\alpha_k|^2$ is the energy stored in each resonant mode. Energy is coupled in/out of each cavity mode through a designated input/output port (e.g. waveguide). The propagating modes in the input/output ports are similarly represented. The relevant incoming and outgoing wave amplitudes are represented by the variables $s_k^+(t)$ and $s_k^-(t)$ respectively, where $|s_k^\pm(t)|^2$ is the power of the propagating mode. Leakage from a cavity mode is described by the loss rate, $\gamma_k = \omega_k/2Q_k$, where $Q_k$ is the Quality factor of that mode. One can decompose this cavity loss rate into $\gamma_k = \gamma_{k,s} + \gamma_{k,l}$, where, $\gamma_{k,l}$ represents intrinsic losses (absorption/scattering), while $\gamma_{k,s}$ represents coupling to the input/output port. The incoming and outgoing waves are related by $$s_k^- = -s_k^+ + \sqrt{2\gamma_{k,s}}\,\alpha_k \qquad (1)$$

The invention requires the assumption that the nonlinear polarizations are sufficiently weak to be treated in the perturbative limit ($\delta P_{k,NL} \ll P_k$). By extending the formalism to non-degenerate three-wave mixing, where one can assume there is no input at the signal frequency ($s_T^+ = 0$), the coupled wave equations can be written as $$\frac{da_1}{dt} = -\gamma_1 a_1 - i\omega_1 \beta_1 a_2 a_T + \sqrt{2\gamma_1 \Gamma_1}\, s_1^+ \qquad (2)$$

$$\frac{da_2}{dt} = -\gamma_2 a_2 - i\omega_2 \beta_2 a_1 a_T^* + \sqrt{2\gamma_2 \Gamma_2}\, s_2^+ \qquad (3)$$

$$\frac{da_T}{dt} = -\gamma_T a_T - i\omega_T \beta_T a_1 a_2^* \qquad (4)$$

where $\Gamma_k \equiv \gamma_{k,s}/\gamma_k$ is the fraction of power escaping from the cavity that is collected into the input/output waveguide. The coupling constants ($\beta_k$) are determined by first order perturbation theory, where one can also normalize so that $|\alpha_k|^2$ is the energy stored in each mode, remaining consistent with Eqs. (1-4). This yields the following expression for the coupling coefficients:

$$\beta \equiv \beta_1 = \qquad (5)$$
$$\beta_2^* = \beta_T^* = \frac{1}{4} \frac{\int d^3x \sum_{i,j,k} \varepsilon_0 \chi^{(2)}_{ijk} E_{1,i}^*(E_{2,j}E_{T,k} + E_{T,j}E_{2,k})}{\sqrt{\int d^3x \varepsilon |E_1|^2}\sqrt{\int d^3x \varepsilon |E_2|^2}\sqrt{\int d^3x \varepsilon |E_T|^2}}$$

where $\epsilon = \epsilon_r \epsilon_0$ is the dielectric constant of the considered material at the corresponding resonance frequency. The above equations (subject to Kleimann symmetry in $X^{(2)}$) satisfy the energy conservation condition, $\beta_1 = \beta_2^* = \beta_T^*$. Hereafter the parameters, $\beta_k$, will be replaced with the single parameter, $\beta$, which is defined in Eq. (5), with $\beta$ represented in units of $J^{-1/2}$. Optimization of the mode overlap, $\beta$, in Eq. (5) is analogous to satisfying the phase-matching condition in the nonlinear mixing of propagating modes.

DFG efficiency can be assessed by analyzing the steady state solutions ($d\alpha_k(t)/dt = ds_k^\pm(t)/dt = 0$) of the coupled wave equations (2-4). In contrast with degenerate nonlinear frequency conversion (e.g. second harmonic generation) [21], the non-degenerate case (e.g. DFG) does not allow for 100% conversion of power from $\omega_1$ to $\omega_T$. This arises because the destruction of a photon at $\omega_1$ and the creation of a photon at $\omega_T$ is always accompanied by the creation of a second photon at $\omega_2$. This fundamental constraint is described by the Manley-Rowe equations [1]. Considering also losses ($\Gamma_k$), the quantum limit of conversion efficiency is given by:

$$\frac{|s_T^-|^2}{|s_1^+|^2} \leq \frac{\omega_T}{\omega_1}\Gamma_1 \Gamma_T \qquad (6)$$

This condition can be derived directly from the steady-state coupled wave equations, and will be shown once Eqs. (2-4) are re-expressed in dimensionless form. The conversion efficiency is maximized by maximizing the ratios, $\Gamma_1$ and $\Gamma_T$. This means that overcoupling the cavity modes to the input/output waveguide is essential to achieving high conversion efficiency. Namely, it is more important that the quality factors be limited by leakage to the desired output port than that they be high. However, notice that the loss ratio in the idler, $\Gamma_2$, does not appear in Eq. (6), i.e. does not affect the overall efficiency. This is because power at $\omega_2$ is being input but is not down-converted; therefore losses can be compensated for by pumping in more power at this frequency. One can find a critical relationship between the input powers, $|s_1^+|^2$ and $|s_2^+|^2$ that allows for maximum conversion efficiency (complete depletion of the pump) by imposing either of the following equivalent constraints: $s_1^- = 0$ or equality in Eq. (6). This relationship is given by:

$$|s_2^+|^2 = \frac{\omega_2 \left|1 - \frac{4}{\omega_1}|\beta|^2 Q_1 Q_2 Q_T \Gamma_1 |s_1^+|^2\right|^2}{16|\beta|^2 Q_1 Q_2 Q_T \Gamma_2} \qquad (7)$$

Notice that the power input into the cavity at the idler frequency, $|s_2^+|^2$, depletes the signal ($\omega_T$) when nonlinearly converted (via sum-frequency generation), and produces power at the pump ($\omega_1$). Therefore, in the case in which the pump is completely depleted ($s_1^- = 0$), no net power from the idler frequency is converted and $|s_2^-|^2 = |s_2^+|^2 + |s_1^+|^2\Gamma_1\Gamma_2\omega_2/\omega_1$. The conversion of the total input power, $|s_1^+|^2 + |s_2^+|^2$, is thus maximized in the limit $|s_2^+|^2 \to 0$, $|s_1^+|^2 = \omega_1/(4|\beta|^2 Q_1 Q_2 Q_T \Gamma_1)$. Note, however, that Eqs (2-4) require a non-zero value (this can be arbitrarily small) of $|s_2^+|^2$ for non-zero conversion efficiency. Eq. (7) also allows for quantum-limited conversion for an arbitrarily small value of $|s_1^+|^2$ as $|s_2^+|^2 \to \omega_2/(16|\beta|^2 Q_1 Q_2 Q_T \Gamma_2)$. This is a unique property of the non-degeneracy of DFG, and could prove useful for low power applications. A similar result was found in the quantum limit for doubly resonant DFG, specifically that a single photon could be converted at high efficiency from $\omega_1$ to $\omega_T$, given an appropriate pump power at $\omega_2$. Note that in both limits the optimal input power is proportional to $1/Q_1 Q_2 Q_T$. A similar result was found in the degenerate case of second harmonic generation, where the critical power scaled as $1/Q_1 Q_2^2$. This optimal power also depends on the cavity mode-volumes implicitly through the nonlinear overlap, $\beta$. In the specific case of THz generation through DFG of telecom-band modes ($\omega_1 \approx \omega_2$), assuming the two telecom-band modes have the same mode volume ($V_1 \approx V_2$), then under the conditions of best possible overlap, the overlap would scale as $\beta \sim 1/V_T^{1/2}$. This means that in triply resonant THz generation, the mode volumes of the telecom-band cavities do not affect the strength of the nonlinear coupling, provided they match each other.

The structure of Eqs. (2-4) is analyzed in detail. The dynamics that are qualitatively universal to all triply resonant DFG processes is to be identified, i.e. that do not depend explicitly on $\{Q_k, \omega_k, \beta\}$. To do this, it is helpful to redefine the variables $\{\alpha_k, s_k^\pm\}$ in a dimensionless form that removes as many of the parameters, $\{Q_k, \omega_k, \beta\}$, as possible. This is best accomplished by rescaling the variables, $\{t, \alpha_k, s_k^\pm\}$, as follows:

$$T \equiv \gamma_1 t = \frac{\omega_1 t}{2 Q_1} \quad (8)$$

$$A_k \equiv 2\sqrt{\frac{Q_1 Q_2 Q_T}{Q_k}} [\beta^* + \delta_{k,T}(-i\beta - \beta^*)] a_k \quad (9)$$

$$S_k \equiv 4\sqrt{\frac{Q_1 Q_2 Q_T \Gamma_k}{\omega_k}} \beta^* s_k^+ \quad (10)$$

where $\delta_{k,T}$ is the Kronecker delta. One can also define a dimensionless parameter that quantifies the DFG efficiency:

$$E_{ff} \equiv \frac{\omega_1}{\Gamma_1 \Gamma_T \omega_T} \frac{|s_T^-|^2}{|s_1^+|^2} = 4 \frac{U_T}{P_1} \quad (11)$$

where the notation, $|A_k|^2 \equiv U_k$, $|S_k|^2 \equiv P_k$ is introduced for the normalized energy and power, respectively. In this notation, the quantum limit corresponds to $E_{ff} = 1$. The dimensionless coupled mode equations are given by $$\frac{dA_1}{dT} = -A_1 + A_2 A_T + S_1 \quad (12)$$

$$\frac{dA_2}{dT} = r_2 [-A_2 - A_1 A_T^* + S_2] \quad (13)$$

$$\frac{dA_T}{dT} = r_T [-A_T - A_1 A_2^*] \quad (14)$$

where $r_k = \gamma_k/\gamma_1$. Since $S_1$ and $S_2$ denote amplitudes of waves with different frequencies, the time origin can be redefined so that both $S_1$ and $S_2$ are positive real numbers (i.e. the waves are in phase at T=0), assuming that the waves are not phase modulated. It follows that the normalized mode amplitudes, $A_1$, $A_2$ and $A_T$ are purely real in any steady state solution. In the steady state, Eqs. (12-14) simplify to, $$A_1 = \frac{S_1}{(1 + U_2)} \quad (15)$$

$$A_2 = \frac{S_2}{(1 - U_1)} \quad (16)$$

$$A_T = -A_1 A_2 \quad (17)$$

Note that, the steady state solutions ($dA_k/dT = 0$) do not depend on the geometry-specific parameters, $r_k$, and thus can be treated in a general form for an arbitrary system. Specifically the conditions for efficient conversion will depend only on the generalized input parameters, $S_k$, whose magnitude is related to the input power by Eq. (10). However the stability of the steady-state solutions may in general depend on the specific geometry ($r_k$), as shown below. An analogous simplification was also found in third harmonic generation ($X^{(3)}$) in doubly resonant systems, however in this case the competition between frequency conversion and self-action processes (self-phase modulation and cross-phase modulation), prevented the structure of the steady-state solutions from being completely geometry-independent. Using Eqs. (15-17), the dimensionless efficiency parameter can be expressed in the steady state as purely a function of the energy in the idler cavity, $U_2$:

$$E_{ff} = \frac{4 U_2}{(1 + U_2)^2} \quad (18)$$

One can now easily verify that the quantum limit is enforced by the coupled wave equations (2-4), that is $E_{ff} \leq 1$ in the steady state. Further, the quantum-limited conversion is achieved when $$U_2 = 1, U_1 = U_T = \frac{P_1}{4}, P_2 = \left(1 - \frac{P_1}{4}\right)^2 \quad (19)$$

Stability of steady state solutions in a nonlinear dynamical system can be analyzed qualitatively based on the eigenvalues of the points' Jacobian matrices. A steady state is stable if all the eigenvalues of its Jacobian have a negative real part. The Jacobian can then be written as:

$$J = \begin{bmatrix} -1 & A_T & A_2 \\ -r_2 A_T & -r_2 & -r_2 A_1 \\ -r_T A_2 & -r_T A_1 & -r_T \end{bmatrix} \quad (20)$$

The stable solutions with maximum- and minimum-efficiency are shown in FIGS. 5A-5B respectively where steady state solutions for $r_2 = r_T = 0.4$. The dotted line 97 in FIGS. 5A-5B indicates a saddle-node bifurcation. In the region to the left of this line 97 (lower values of $P_1$) there is only one steady state solution. To the right of this line 97, there are three possible steady states for every combination of CW input powers, two of which are stable.

Given that there exists a large region of the $\{P_1, P_2\}$ parameter space with only one solution to Eqs. (15-17), one would expect there to exist a subset of this region where this solution is stable for any geometry $\{r_2, r_T\}$. In fact, it can be shown that in the entire region this solution is stable in all geometries (in the region where there is only one solution). This can be proven by analyzing the Jacobian's characteristic polynomial using the Routh-Hurwitz algorithm. The characteristic polynomial of Eq. (20) can be written in the form $\lambda^3 + B\lambda^2 + C\lambda + D = 0$. Using Eqs. (15-17) to simplify, one can find that:

$$B = 1 + r_2 + r_T \quad (21)$$

$$C = r_2 r_T (1 - U_1) + r_2\left(1 + \frac{1}{4} E_{\!f\!f} P_1\right) + r_T(1 + U_2) \quad (22)$$

$$D = r_2 r_T\left(1 - U_1 + U_2 + \frac{3}{4} E_{\!f\!f} P_1\right) \quad (23)$$

Note that all variables in Eqs. (21-23) can only have real positive values. The signs of the real parts of the Jacobian's eigenvalues can be determined by analyzing the first column of the Routh-Hurwitz matrix. If all entries in the column have the same sign then there are no eigenvalues with positive real parts. For the Jacobian this column is given by, $$\{H_{i,1}\} = \begin{bmatrix} 1 \\ B \\ \frac{1}{B}(BC - D) \\ D \end{bmatrix} \quad (24)$$

The additional constraint that no eigenvalues have a real part equal to zero imposes the further constraints, (BC−D), D≠0. If one requires $U_1 \leq 1$, all the coefficients (B-D) are strictly positive. In this case, both constraints are reduced to a single condition, (BC−D)>0. The term, BC−D, can be expressed as $$BC - D = r_2 r_T\left[(r_2 + r_T)(1 - U_1) + 2\left(1 - \frac{E_{\!f\!f} P_1}{4}\right)\right] + \quad (25)$$
$$\left(1 + \frac{E_{\!f\!f} P_1}{4}\right)(1 + r_2)r_2 + (1 + U_2)(1 + r_T)r_T$$

Therefore, a steady-state solution is stable in all geometries when $U_1 < 1$, $P_1 \leq 4/E_{\!f\!f}$. It follows from Eq. (15) that all steady states are stable when $P_1 \leq 1$. In fact numerically it is found that these conditions are satisfied for the steady state solution everywhere in the region of mono-stability (FIGS. 5A-5B, to the left of the dotted line 97). Thus, one can expect universal dynamics in this region of $\{P_1, P_2\}$ space, with the conversion efficiency stabilizing to a value determined purely by the input powers, $P_1$, $P_2$, shown in FIGS. 5A-5B. Furthermore, for all $P_1 < 4$, the solution with quantum-limited efficiency given in Eq. (19), is universally stable (for all $r_2$ and $r_T$). For Eq. (19) with $P_1 > 4$, stability is guaranteed by (21-25) when $r_T < 0.414$ ($2^{1/2} - 1$).

Figure 6A:
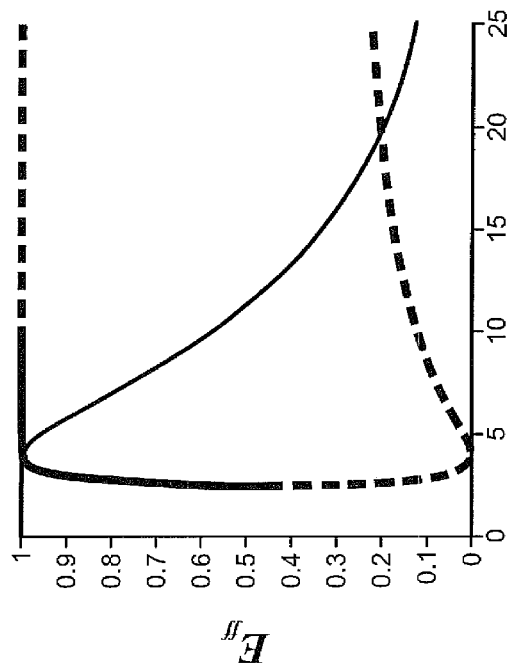
FIGS. 6A-6B are graphs illustrating the effect of geometry on the conversion efficiency and stability of steady state solutions.
Figure 6B:
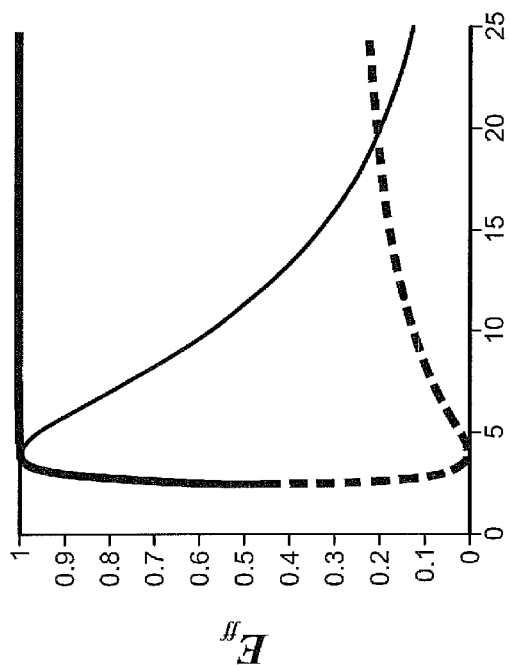

FIGS. 6A-6B demonstrate how the stability of the high efficiency solutions varies with the geometric parameters, $r_2$ and $r_T$, for $P_1 > 4$ when $P_1$ and $P_2$ are related by Eq. (19). When $r_2$ and $r_T$ are both large, there remains only one stable solution (shown by the black curve in FIGS. 6A-6B) for all $P_1$, which has quantum-limited efficiency for $P_1 < 4$.

Stability is also independent of the parameters, $\{r_2, r_T\}$, in the limit $P_2 \ll 1$. It is expected that there will be multiple steady states for $P_1 > 1$. One can analytically determine the efficiencies and stabilities of all steady state solutions in this limit. For any value of $P_1 \neq 1$, there is one solution where $U_1 \rightarrow P_1$, $U_2 \rightarrow 0$, and $E_{\!f\!f} \rightarrow 0$ (see Eqs. (15-17)). This will be the only solution for $P_1 < 1$. In particular, it follows directly from Eqs. (21-25) that this solution is universally stable for $P_1 < 1$ and universally unstable for $P_1 > 1$. For $P_1 > 1$, there is an additional pair of solutions in which $U_1 \rightarrow 1^+$, and $U_1 \rightarrow 1^-$. These solutions differ only by the sign of $A_2$ (phase), both having $U_2 = P_1^{1/2} - 1$, and $E_{\!f\!f} = 4(P_1^{1/2} - 1)/P_1$. It can also be shown directly from Eqs. (21-25) that both of these solutions are stable for all geometries. This means that to a good approximation, all geometries display only one stable conversion efficiency as a function of $P_1$ for $P_2 \ll 1$.

In addition to verifying the stability of high conversion-efficiency solutions, it is important to assess how one can excite these solutions. In the monostable region, the efficiency will stabilize at the value shown in FIGS. 5A-5B for all excitations, however different excitation patterns can lead to different long-time stabilities in the bistable region. This principle was demonstrated for multi-stable conversion in doubly resonant third harmonic generation. FIG. 5C shows the asymptotic solution reached after a simple step excitation ($U_k(T=0)=0$, $P_k(T \geq 0)$=constant, $P_k(T<0)=0$, $\gamma_2 = \gamma_T = 0.4$). For $P_1 < 4$, quantum limited conversion is achieved from a step excitation when $P_2$ is given by Eq. (19), however this is not true for $P_1 > 4$. A more complicated excitation scheme would be required to excite the high-efficiency solution in this case. The particular class of "easily accessible" steady-state solutions shown in FIG. 5C has a slightly increased domain of universal stability, $U_1 < 1$, $P_1 \leq 4/E_{\!f\!f}$, indicated by the region to the left of the dashed line 98 in FIG. 5C, which extends beyond the region of monostability. In particular, universal stability is guaranteed in this set of solutions for all $P_1 < 4$.

Figure 7:
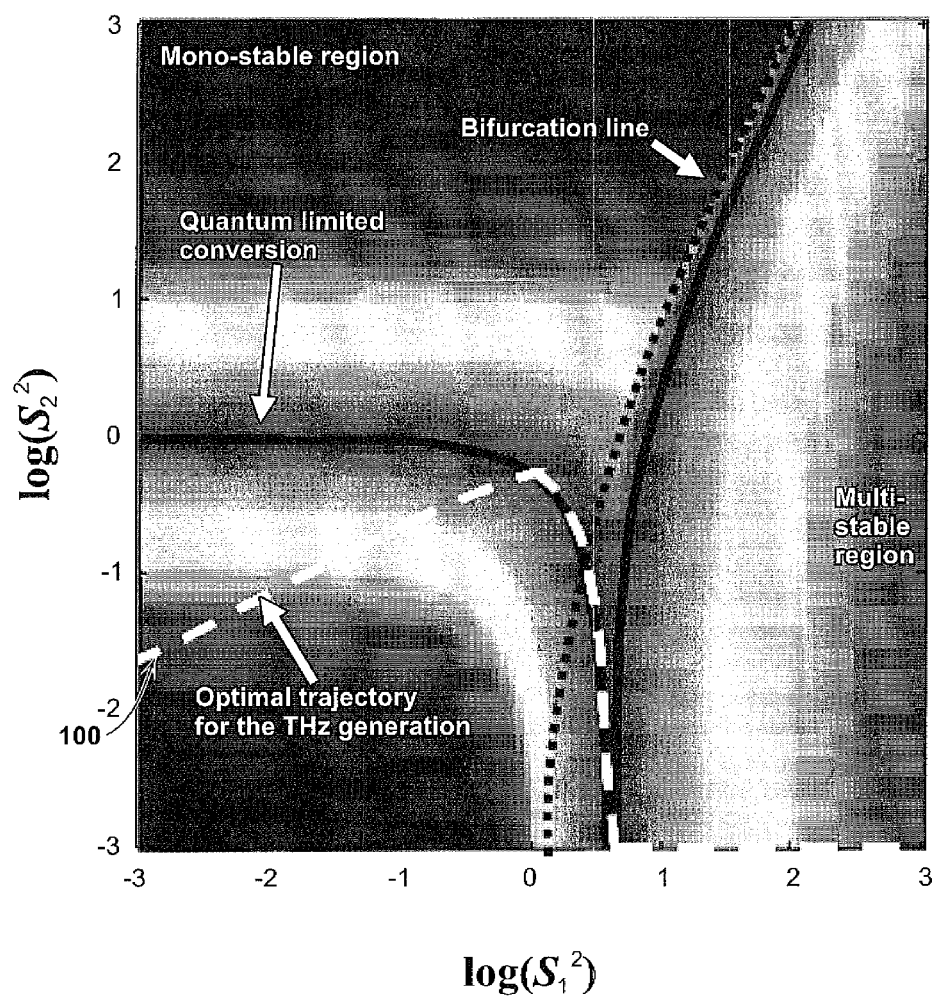
FIG. 7 is a graph illustrating the suggested trajectory in the space for THz generation in a single device.

It is important for many applications that a single cavity system (fixed $Q_k$, $\omega_k$, $\beta$) is capable of operating efficiently over a broad range of power levels. Operation of a single system is optimized when the pump and idler powers follow a trajectory that optimizes the total power conversion ($|s_T^-|^2/[|s_1^+|^2+|s_2^+|^2]$). In general this trajectory can be transcribed onto the plot in FIG. 7 in normalized co-ordinates, however this curve is not unique in the space of normalized powers $\{P_1, P_2\}$ as they will depend on the ratio of the pump and idler frequencies $\omega_1/\omega_2$. For THz generation based on the difference frequency of telecom or optical modes it is safe to make the assumption $\omega_1/\omega_2 \approx 1$. FIG. 7 is an expanded view of FIG. 5A showing on the dashed line 100 the optimized trajectory for single cavity operation in the case of THz generation. In the monostable region, this trajectory optimizes total power conversion. In the multistable region ease of excitation and stability are considered. While for $P_1 > 4$, it is possible to excite slightly higher efficiency solutions (~10%), these solutions are bistable and a composite excitation is required to excite these solutions (lower efficiency solutions are more easily excited). These high efficiency solutions are also only stable for a limited range of Q-factor ratios ($r_2$, $r_T$). Beyond $P_1 = 4$, keeping the idler power low ($P_2 \ll 1$) ensures high efficiency monostable conversion.

Now the regions of the dimensionless parameter space are accessible for a given geometry ($Q_k$, $\omega_k$, $\beta$). Sufficient resonance enhancement of the density of optical modes at each of the three frequencies ($Q_k \gg 1$) is required in order to effectively suppress coupling to other frequencies (e.g. the sum frequency, $\omega_1+\omega_2$). CMT relies on the slowly-varying amplitude approximation ($|d\alpha_k/dt|<<|\omega_k\alpha_k|$). This condition can be mapped into the dimensionless parameter space, imposing the following conditions on the cavity quality factors:

$$\frac{U_1}{2Q_2} \ll 1, \frac{U_2}{Q_1} \ll 1 \qquad (26)$$

In the case that $E_{ff}=1$, Eq. (26) reduces to, $$P_1 << 8Q_2 \qquad (27)$$

When Eqs. (26-27) are not satisfied, it implies that the nonlinear terms in Eqs. (2-4) are sufficiently large that the perturbative treatment of the nonlinearity and the slowly varying amplitude approximation are no longer valid. A final consideration that must be made is that the energy in the cavity is sufficiently below the threshold for the appearance of higher order regimes or material damage. While Eqs. (26-27) ensure that effects owing to $X^{(2)}$ remain in the perturbative limit, the nonlinear coupling strength (quantified by $\beta$) must also be sufficiently large for high efficiency conversion to be achievable below the damage threshold. The average energy density in the $k^{th}$ mode can be related to the corresponding dimensionless energy parameter ($U_k$) by, $$\xi_k = \frac{U_k Q_k}{4 Q_1 Q_2 Q_T |\beta|^2 V_k} \qquad (28)$$

where $V_k$ is the mode volume at $\omega_k$. Recall that $|\beta|^2$ has units of inverse energy. This energy density can be compared to the material and frequency dependent threshold for the appearance of higher order nonlinear effects or material damage (breakdown) for a specific geometry.

The above described theory is applied to analyze efficient THz generation by the first physical implementation disclosed here. This implementation makes use of the orders-of-magnitude difference in wavelengths of THz and visible/NIR radiation to allow independent design of the NIR and THz cavities. The key requirement of such a design is that the NIR cavity be sufficiently small in comparison to the THz cavity that the THz mode is not significantly altered by placing the NIR cavity nearby. One can examine in detail a specific implementation of this concept, shown in FIG. 2A, where the NIR cavity is a dual-mode photonic crystal nanobeam cavity placed in the proximity of a perpendicularly oriented THz nanobeam cavity.

In order to estimate the coupling constant, $\beta$, a geometry similar to that shown in FIG. 2A is considered: a photonic crystal "nanobeam" (PhCNB) cavity 24, with closely-spaced TE and TM modes in the telecom spectral region ($\omega_1/2\pi$, $\omega_2/2\pi \sim 200$ THz) positioned on top of larger THz cavity 26. These cavities, both telecom and THz, are based on a free-standing ridge waveguide patterned with a one-dimensional (1D) lattice of holes, utilizing a tapered photonic crystal cavity approach that has been recently demonstrated. By engineering the impedance matching between the cavity mode and evanescent Bloch-mode that exists in the photonic crystal (Bragg) mirror demonstrated, both experimentally and theoretically, Quality factors on the order of $10^6$.

Moreover, the inventive monolithic cavity design supports orthogonal TE and TM modes, which is necessary to achieve efficient nonlinear conversion as dictated by the nonlinear tensor of a III-V semiconductor material. A key design point is that the TE and TM cavity modes can be tuned independently by varying the cross-sectional aspect ratio of the ridge. As a practical implementation, a PhCNB cavity is designed with fundamental TE mode at 193.9 THz ($V=0.6(\lambda/n)^3$) and TM mode at 195 THz ($V=1.34 (\lambda/n)^3$). A finite-difference time-domain code (FDTD) was used to independently design telecom and THz cavities, and a CMT model was used to describe the nonlinear frequency conversion. The Q factors in the cavities are designed to be limited by out-of plane scattering. Then, on one side, the mirror (number of holes) is shortened in order to over-couple the cavity to the input/output waveguide, in order to strongly couple the cavity to desired channel which in turn reduces the maximum values of Q by an order of magnitude. This over-coupling minimizes the reduction in efficiency caused by losses, and enables operation close to quantum-limited conversion.

The case where both cavities are composed of GaAs ($n \approx 3.4$) was considered, and the telecom cavity is suspended slightly above the THz cavity at height, $d<<\lambda_T$ (again $\omega_T/2\pi \sim 1.5$ THz). In this geometry one can find a coupling constant, $\beta \approx 1.5$ $W^{-1/2}$. The cavity Q-factors of all three modes can be optimized so that maximum conversion efficiency (normalized $S_1^2=4$) occurs at the desired power level. Moreover, one can find that small adjustments in the geometry (e.g. over-coupling) allows for large tuning of the Q-factors with minimal effect on the coupling constant, $\beta$. Higher Q-factors allow for optimal conversion at lower powers.

The decoupled nature of the length-scales used in this design allows complete freedom in the design of the THz cavity—any linearly polarized cavity mode in the THz range can be coupled to a nearby dual-mode nanobeam cavity with the appropriate orientation. For example, the THz cavity could be a ring resonator, micro-toroid, 2D photonic crystal, or a metamaterial-based cavity. The dual mode cavity can also alternatively be a 2D photonic crystal cavity, which has also been shown to support multiple high-Q modes with different polarization.

The above described theoretical framework can be applied to analyze in detail the generation of THz that takes place in the structure displayed in FIG. 3A. To gain insight into the optimization of the nonlinear coupling coefficient for this design, one can start by rewriting in cylindrical coordinates 49 the expression for the relevant component of the nonlinear polarization vector. Using the definition for the coordinates (r, $\theta$) 49 shown in top inset of FIG. 3B, and assuming that the structure is created from GaAs, one finds, $$P_z(r,\theta) = 2\epsilon_0 d_{14}(r)[E_{1,r} E^*_{2,\theta} \cos^2\theta - E_{1,\theta} E^*_{2,r} \sin^2\theta + (E_{1,r} E^*_{2,r} - E_{1,\theta} E^*_{2,\theta}) \sin\theta \cos\theta] \qquad (29)$$

where $E_{i,r}$ and $E_{i,\theta}$ stand for the radial and azimuthal electric field components of the two TE-polarized WGM modes considered in the scheme. Here the subindex i labels the corresponding WGM mode. Also note that for the structure displayed in FIG. 3B, $d_{14}(r)$ is non zero only in the region r<R.

Now, inserting in Eq. (29) the explicit dependence of $E_{i,r}$ and $E_{i,\theta}$ on the azimuthal coordinate $\theta$, given by $E_{i,r}(r,\theta) = \phi_{i,r}(r)\exp(-i\, m_i\, \theta)$ and $E_{i,\theta}(r,\theta) = \phi_{i,\theta}(r)\exp(i\, m_i\, \theta)$ (where $m_i$ is an integer), $P_z(r, \theta)$ can be written as $$P_z(r;\theta) = \epsilon_0 d_{14}(r)\exp[(m_2-m_1)\theta] [h_1(r) \sin 2\theta - 4 h_2(r) \sin^2\theta + h_3(r)] \qquad (30)$$

where one can define $$h_1(r) = \phi_{1,r}(r)\phi^*_{2,r}(r) - \phi_{1,\theta}(r)\phi^*_{2,\theta}(r) \qquad (31)$$

$$h_2(r) = \phi_{1,r}(r)\phi^*_{2,\theta}(r) - \phi_{1,\theta}(r)\phi^*_{2,r}(r) \qquad (32)$$

$$h_3(r) = \phi_{1,r}(r)\phi^*_{2,\theta}(r) \qquad (33)$$

Thus, using Eqs. (30)-(33) the nonlinear coupling coefficient $\beta_T$ can be written as $$\beta_T = \frac{\int dz \int d\theta \int dr r \varepsilon_0 d_{14}(r) E^*_{THz}(r,\theta)\exp(-i\Delta m\theta)}{\sqrt{\int d\vec{r}\varepsilon_0 n_1^2(\vec{r})\left|\vec{E}_1(\vec{r})\right|^2}\sqrt{\int d\vec{r}\varepsilon_0 n_2^2(\vec{r})\left|\vec{E}_2(\vec{r})\right|^2}} \quad (34)$$

$$\sqrt{\int d\vec{r}\varepsilon_0 n_T^2(\vec{r})\left|\vec{E}_T(\vec{r})\right|^2}$$

with $$g_1(r) = h_2(r) - \frac{i}{2}h_1(r) \quad (35)$$

$$g_2(r) = h_3(r) - 2h_2(r) \quad (36)$$

Thus, from Eq. (34) it can be deduced a large value of the nonlinear coupling coefficient can be obtained when the dependence of $E^*_{THz}(r,\theta)$ on the azimuthal coordinate $\theta$ cancels the modulation introduced in the integrand of Eq. (34) by $\exp[i(\Delta m \pm 2)]$. This condition can be viewed as a generalization of the canonical phase-matching condition obtained for efficient nonlinear frequency mixing in standard dielectric waveguides. For GaAs, assuming that the refractive indexes at $\lambda_2=1.550$ μm and $\lambda_T=300$ μm are $n_2=3.45$ and $n_T=3.61$, respectively, an optimal configuration is found that corresponds to two WGM's with $m_1=575$ and $m_2=572$ embedded in a dipole-like defect mode of a photonic crystal. Note that in this case $m_1-m_2=3$, he dipole THz-scale (characterized by $m=1$) phase matches the dependence $\exp[i(\Delta m \pm 2)]$. Thus, using the corresponding electric field components computed by means of a FDTD method, one can obtain a value for nonlinear coupling coefficient of $\beta=1.2$ $J^{-1/2}$.

Figure 8:
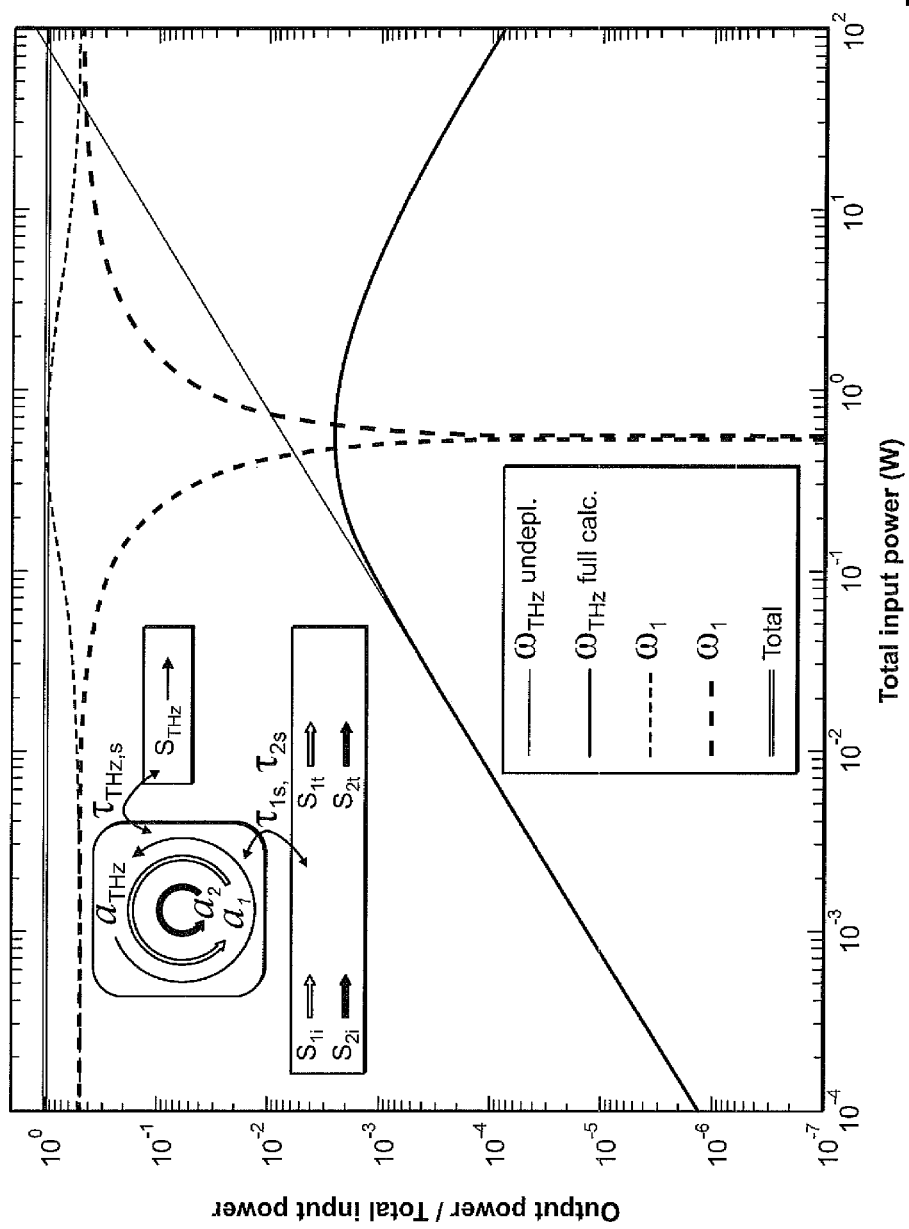
FIG. 8 is a graph illustrating the conversion efficiencies for three frequencies involved in the nonlinear conversion process as a function of the total input power.

The THz output power in this system can be computed using from Eqs. (2)-(5), but now replacing the reflected field amplitudes corresponding to the pump and idler frequencies defined by Eq. (1) by the transmitted amplitudes, as shown in inset of FIG. 8 for the definition of the different magnitudes employed in the CMT description of this system. FIG. 8 displays the conversion efficiency, obtained by assuming that the Q-factors for the three resonant frequencies are the same and equal to $5 \times 10^4$. In addition, in this calculation it is assumed $P_{1in}=P_{2in}$. The dependence of the conversion efficiency on the ratio $S_2^2/S_1^2$ can be deduced from FIG. 7. As can be seen in FIG. 8, for $P_{1in}=P_{2in}$, the maximum conversion efficiency when no losses are included in the calculation is given by $\eta_{max}=\omega_T/(2\omega_1)$. As discussed for the quantum-limited efficiency, the effect of considering the absorption losses in THz will simply rescale the conversion efficiencies displayed in FIG. 8 by a factor $\Gamma_1\Gamma_T$.

It has been demonstrated that overlap constants ($\beta$) of 1.2 $J^{-1/2}$ or greater using both of the above implementations for triply resonant THz generation. As mentioned in the herein, the power levels at which THz radiation can be generated most efficiently in a given implementation depends only on the three frequencies, the overlap constant and the product of the three mode Q-factors. Here one can assume that the cavities are overcoupled to their respective waveguides and thus neglect losses. THz generation with quantum limited efficiency requires that the product $16Q_1Q_2Q_T|\beta|^2P_{in}/\omega_{12}$ is of order 1 or greater. Total power conversion is optimized when this product is equal to 4. FIG. 9B shows the optimal input power as a function of the Q-factor product for $\beta=1.2$ $J^{-1/2}$. For some applications where a single cavity must operate across a range of different power levels, the best performance is achieved by varying the two input powers $(|s_1^+|^2+|s_1^+|^2)$ to fit the trajectory outlined by the dashed line 100 in FIG. 7.

Figure 9A:
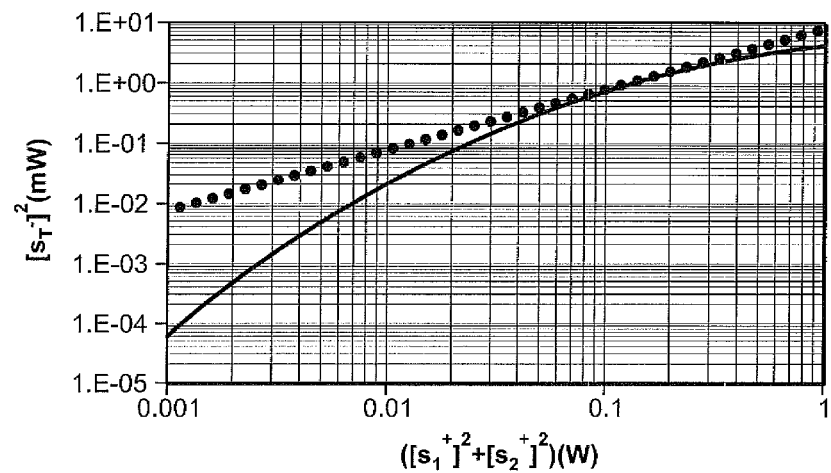
FIG. 9A-9B are graphs illustrating dependence on the product of the cavity quality factors of the input power yielding optimal efficiency and the corresponding THz output power.
Figure 9B:
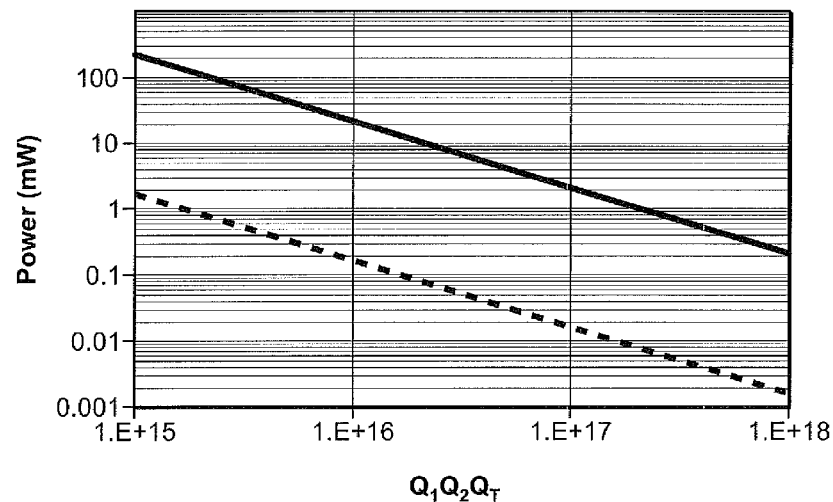

This optimal output power is shown in FIG. 9A for the for $Q_1Q_2Q_T\sim1\times10^{15}$, a value that is attainable since for example Q-factors larger than $10^6$ have been demonstrated for all three modes in the PhCNB cavity geometry.

The invention provides feasible platforms for high efficiency THz generation in triply resonant photonic resonators. First, by placing a double mode NIR/visible cavity with closely spaced resonant modes near the field maximum of a much larger cavity with a THz mode, the invention allows a high nonlinear mode overlap to be attained through independent design of the NIR and THz cavities, exploiting their vastly different length-scales. In addition, the invention provides an implementation where a dual-mode NIR cavity acts as a component of a THz-scale cavity, with the NIR cavity having a considerable effect on the THz modes. In both systems, complete pump depletion can occur at all powers provided the correct pump:idler power relationship. Total power conversion approaches the quantum limit at a critical power which can be tuned by varying the product of the three mode Q factors.

In addition, the invention uses a general analysis of nonlinear second order difference frequency generation (DFG) where all three modes are resonant. The equations governing the system can be scaled into a set of universal dimensionless parameters and that the steady state solutions (corresponding to CW conversion) only depend on the generalized parameters, (labeled as $P_1$ and $P_2$), which are directly proportional to the input powers of the pump and idler respectively. As $P_1$ increases for any fixed $P_2$, a saddle-node bifurcation is reached, below which there only one steady-state solution whose stability is universal, and above which, there exist three solutions whose stabilities can vary with geometry and in many cases bistability.

The CW conversion from pump to signal with quantum-limited efficiency (the pump beam is perfectly depleted and the pump:signal conversion ratio is given by the frequency ratio) is possible in such a system for any power of the pump wave, provided a specific input power at the idler frequency. Quantum-limited conversion can occur with arbitrarily small idler power when the pump power approaches the critical value $|s_1^+|^2=\omega_1/(4|\beta|^2Q_1Q_2Q_T\Gamma_1)(P_1=4)$; where $\beta$ quantifies the mode overlap, which implicitly depends on the cavity mode-volumes and the phase matching of the modes, $\Gamma_1$ denotes losses at the pump frequency, and $\{Q_k\}$ are the cavity mode quality factors. This critical power also acts as a threshold, below-which quantum-limited conversion is always stable and above-which the stability depends on geometry.

Linear losses do not qualitatively change the dynamics, but do cause a reduction in conversion efficiency. The efficiency is maximized when theoretical quality factors are kept sufficiently low that they are limited by coupling to the input/output port. A similar universal framework is expected to exist for second-order sum-frequency generation as well.

Although the present invention has been shown and described with respect to several preferred embodiments thereof, various changes, omissions and additions to the form and detail thereof, may be made therein, without departing from the spirit and scope of the invention.

The invention claimed is:

1. A system for efficient generation of THz radiation comprising:
   a triply-resonant nonlinear photonic resonator coupled to at least one near-infrared (NIR) or optical waveguide and to at least one THz waveguide, wherein energy traveling through the at least one near-infrared (NIR) or optical waveguide is converted to THz radiation inside the triply-resonant photonic resonator via a nonlinear difference frequency generation (DFG) process.

2. The system of claim 1, wherein the triply-resonant photonic resonator comprises a nonlinear photonic resonator for NIR or optical frequencies embedded in or placed in the proximity of a photonic resonator for THz frequencies, in such a way that if the NIR cavity is removed a THz cavity mode would be significantly modified.

3. The system of claim 2, wherein the nonlinear photonic resonator for NIR or optical frequencies comprises a doubly-resonant photonic resonator, the doubly-resonant photonic resonator comprises two resonant wavelengths $\lambda_1$ and $\lambda_2$ in air that support two resonant modes characterized by quality factors $Q_1$ and $Q_2$, respectively, and by modal volumes $V_1$ and $V_2$, respectively; with 400 nm<$\lambda_1$<20 µm and 400 nm<$\lambda_2$<20 µm.

4. The system of claim 2, wherein the photonic resonator for THz frequencies comprises a resonant wavelength in air $\lambda_T$, a quality factor Q, and a modal volume $V_T$; with 30 µm<$\lambda_T$<3000 µm.

5. The system of claim 4, wherein $Q_1$>100, $V_1$<1000 $\lambda_1^3$, $Q_2$>100, $V_2$<1000 $\lambda_2^3$, $Q_T$>100, and, $V_T$<1000 $\lambda_1^3$.

6. The system of claim 3, wherein the doubly-resonant photonic resonator comprises a photonic crystal cavity or a longitudinally perturbed ridge waveguide or undercut ridge waveguide.

7. The system of claim 2, wherein the photonic resonator comprises a longitudinally perturbed ridge waveguide or undercut ridge waveguide or photonic crystal cavity.

8. The system of claim 3, wherein the resonant modes comprise whispering gallery modes.

9. The system of claim 1, wherein the at least one near-infrared (NIR) or optical waveguide comprises a dielectric waveguide or a photonic crystal waveguide.

10. The system of claim 1, wherein the at least one THz waveguide comprises a dielectric waveguide or a photonic crystal waveguide.

11. The system of claim 3, wherein the nonlinear photonic resonator for NIR or optical frequencies comprises a III/V semiconductor.

12. A method for generating efficient THz radiation comprising:
providing a triply-resonant nonlinear photonic resonator coupled to at least one near-infrared (NIR) or optical waveguide and to at least one THz waveguide; and
converting the THz radiation inside the triply-resonant photonic resonator via a nonlinear difference frequency generation (DFG) process.

13. The method of claim 12, wherein the triply-resonant photonic resonator comprises a nonlinear photonic resonator for NIR or optical frequencies embedded in or placed in the proximity of a photonic resonator for THz frequencies, in such a way that if the NIR cavity is removed a THz cavity mode would be significantly modified.

14. The method of claim 12, wherein the nonlinear photonic resonator for NIR or optical frequencies comprises a doubly-resonant photonic resonator, the doubly-resonant photonic resonator comprises two resonant wavelengths $\lambda_1$ and $\lambda_2$ in air that support two resonant modes characterized by quality factors $Q_1$ and $Q_2$, respectively, and by modal volumes $V_1$ and $V_2$, respectively; with 400 nm<$\lambda_1$<20 µm and 400 nm<$\lambda_2$<20 µm.

15. The method of claim 13, wherein the photonic resonator for THz frequencies comprises a resonant wavelength in air $\lambda_T$, a quality factor Q, and a modal volume $V_T$; with 30 µm<$\lambda_T$<3000 µm.

16. The method of claim 15, wherein $Q_1$>100, $V_1$<1000 $\lambda_1^3$, $Q_2$>100, $V_2$<1000 $\lambda_2^3$, $Q_T$>100, and, $V_T$<1000 $\lambda_1^3$.

17. The method of claim 14, wherein the doubly-resonant photonic resonator comprises a photonic crystal cavity or a longitudinally perturbed ridge waveguide or undercut ridge waveguide.

18. The method of claim 13, wherein the photonic resonator comprises a longitudinally perturbed ridge waveguide or undercut ridge waveguide or photonic crystal cavity.

19. The method of claim 14, wherein the resonant modes comprise whispering gallery modes.

20. The method of claim 12, wherein the at least one near-infrared (NIR) or optical waveguide comprises a dielectric waveguide or a photonic crystal waveguide.

21. The method of claim 12, wherein the at least one THz waveguide comprises a dielectric waveguide or a photonic crystal waveguide.

22. The system of claim 14, wherein the nonlinear photonic resonator for NIR or optical frequencies comprises a III/V semiconductor.

* * * * *